United States Patent
Matoba et al.

(10) Patent No.: US 11,872,721 B2
(45) Date of Patent: Jan. 16, 2024

(54) METHOD FOR PRODUCING CONDUCTIVE HONEYCOMB STRUCTURE AND METHOD FOR PRODUCING ELECTRICALLY HEATING SUPPORT

(71) Applicant: NGK INSULATORS, LTD., Nagoya (JP)

(72) Inventors: Moriaki Matoba, Nagoya (JP); Masahiro Tokuda, Kasugai (JP); Hiroki Kitabayashi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 105 days.

(21) Appl. No.: 17/645,470

(22) Filed: Dec. 22, 2021

(65) Prior Publication Data
US 2022/0281136 A1  Sep. 8, 2022

(30) Foreign Application Priority Data

Mar. 2, 2021 (JP) .................. 2021-032968
Oct. 7, 2021 (JP) .................. 2021-165767

(51) Int. Cl.
*B28B 3/26* (2006.01)
*B28B 11/24* (2006.01)
(Continued)

(52) U.S. Cl.
CPC .......... *B28B 3/269* (2013.01); *B01D 46/2429* (2013.01); *B01D 46/24491* (2021.08);
(Continued)

(58) Field of Classification Search
CPC . B28B 3/269; B28B 17/0081; C04B 38/0009; C04B 38/0051
See application file for complete search history.

(56) References Cited

U.S. PATENT DOCUMENTS

2012/0134891 A1* 5/2012 Boger ................ B01D 46/2455
422/211
2014/0294688 A1 10/2014 Mase et al.
(Continued)

FOREIGN PATENT DOCUMENTS

| CN | 112047738 A | 12/2020 |
| JP | 6111122 B2 | 4/2017 |
| JP | 2019-173663 A | 10/2019 |

OTHER PUBLICATIONS

Chinese Office Action dated Jan. 13, 2023 (Application No. 2021115792696).

*Primary Examiner* — Seyed Masoud Malekzadeh
*Assistant Examiner* — Timothy G Hemingway
(74) *Attorney, Agent, or Firm* — BURR PATENT LAW, PLLC (57) ABSTRACT

A method for producing a conductive honeycomb structure includes: a forming step of extruding a forming raw material to obtain a honeycomb formed body; a drying step of drying the honeycomb formed body to obtain a honeycomb dried body; and a firing step of firing the honeycomb dried body to obtain a honeycomb fired body. The forming step includes controlling a volume fraction of a portion that can form pores of the honeycomb formed body so that an absolute value of a difference in the volume fraction of the portion that can form the pores in predetermined regions of the honeycomb formed body relative to a previously set, predetermined porosity of the honeycomb fired body is within 0.5%. The predetermined porosity is a porosity preset for each of the predetermined regions of the honeycomb fired body.

14 Claims, 5 Drawing Sheets

(51) Int. Cl.
  *B01D 46/24*   (2006.01)
  *C04B 38/00*   (2006.01)
  *F01N 3/027*   (2006.01)
  *B28B 17/00*   (2006.01)
  *C04B 111/94*  (2006.01)
  *C04B 111/00*  (2006.01)

(52) U.S. Cl.
  CPC ........ *B28B 11/243* (2013.01); *B28B 17/0081* (2013.01); *C04B 38/0006* (2013.01); *C04B 38/0009* (2013.01); *C04B 38/0051* (2013.01); *F01N 3/027* (2013.01); *C04B 2111/0081* (2013.01); *C04B 2111/94* (2013.01); *F01N 2240/16* (2013.01); *F01N 2330/06* (2013.01); *F01N 2330/30* (2013.01)

(56) References Cited

U.S. PATENT DOCUMENTS

2019/0299201 A1  10/2019  Takase
2020/0385275 A1  12/2020  Kimata et al.

\* cited by examiner

METHOD FOR PRODUCING CONDUCTIVE HONEYCOMB STRUCTURE AND METHOD FOR PRODUCING ELECTRICALLY HEATING SUPPORT

FIELD OF THE INVENTION

The present invention relates to a method for producing a conductive honeycomb structure, and a method for producing an electrically heating support.

BACKGROUND OF THE INVENTION

Recently, electrically heated catalysts (EHCs) have been proposed to improve a decrease in exhaust gas purification performance immediately after engine starting. For example, the EHC is configured to connect metal electrodes to a pillar shaped honeycomb structure made of conductive ceramics, and conducting a current to heat the honeycomb structure itself, thereby enabling a temperature to be increased to an activation temperature of the catalyst prior to the engine starting.

Patent Literature 1 discloses a honeycomb structure having a structure in which electrical resistivity at a central region is lower than that of an outer peripheral region in a cross section orthogonal to an extending direction of cells in order to reduce the energy used when applying a voltage to purify an exhaust gas in EHC.

Patent Literature 2 discloses a honeycomb structure in which a honeycomb structure is comprised of an outer peripheral region including a side surface, a central region that is a region of the center, and an intermediate region excluding the outer peripheral region and the central region, and an average electrical resistivity A of a material forming the outer periphery region, an average electrical resistivity B of a material forming the central region, and an average electrical resistivity C of a material forming the intermediate region satisfy the relationship $A \leq B < C$, in order to suppress deviation in a heat generation distribution and to achieve even heat generation in the EHC as compared with the prior arts.

CITATION LIST

Patent Literatures

[Patent Literature 1] Japanese Patent No. 6111122 B
[Patent Literature 2] Japanese Patent Application Publication No. 2019-173663 A

SUMMARY OF THE INVENTION

In the arts disclosed in Patent Literatures 1 and 2, the electrical resistivity distribution in the honeycomb structure as described above is controlled by controlling the materials forming the honeycomb structure or by controlling firing conditions in a firing step in a method for producing the honeycomb structure. However, the desired electrical resistivity distribution may not be stably formed due to susceptibility to variations in atmosphere or temperature inside and between kilns used for firing, and there is still room for improvement.

The present invention has been made in light of the above circumstances. An object of the present invention is to provide a method for producing a conductive honeycomb structure and a method for producing an electrically heating support, which can stably form a desired electrical resistivity distribution in a honeycomb structure by a simple method.

The above problem is solved by the following present invention, and the present disclosure is specified as follows:

(1) A method for producing a conductive honeycomb structure, the method comprising:
a forming step of extruding a forming raw material containing a conductive ceramic raw material to obtain a honeycomb formed body, the honeycomb formed body comprising: an outer peripheral wall; and a partition wall disposed on an inner side of the outer peripheral wall, the partition wall defining a plurality of cells to form a flow passage extending from one end face to the other end face;
a drying step of drying the honeycomb formed body to obtain a honeycomb dried body; and
a firing step of firing the honeycomb dried body to obtain a honeycomb fired body,
wherein the forming step comprises a step of controlling a volume fraction of a portion that can form pores of the honeycomb formed body so that an absolute value of a difference in the volume fraction of the portion that can form the pores in predetermined regions of the honeycomb formed body relative to a previously set, predetermined porosity of the honeycomb fired body is within 0.5%; and
wherein the predetermined porosity is a porosity preset for each of the predetermined regions in a cross section perpendicular to a flow passage direction of the cells of the honeycomb fired body.

(2) A method for producing a conductive honeycomb structure, the method comprising:
a forming step of extruding a forming raw material containing a conductive ceramic raw material to obtain a honeycomb formed body, the honeycomb formed body comprising: an outer peripheral wall; and a partition wall disposed on an inner side of the outer peripheral wall, the partition wall defining a plurality of cells to form a flow passage extending from one end face to the other end face;
a drying step of drying the honeycomb formed body to obtain a honeycomb dried body; and
a firing step of firing the honeycomb dried body to obtain a honeycomb fired body,
wherein the drying step comprises a step of controlling a volume fraction of a portion that can form pores of the honeycomb dried body so that an absolute value of a difference in the volume fraction of the portion that can form the pores in predetermined regions of the honeycomb dried body relative to a previously set, predetermined porosity of the honeycomb fired body is within 0.5%; and
wherein the predetermined porosity is a porosity preset for each of the predetermined regions in a cross section perpendicular to a flow passage direction of the cells of the honeycomb fired body.

(3) The method for producing the conductive honeycomb structure according to (1) or (2), wherein the method further comprises the steps of:
producing a honeycomb fired body with unfired electrode portions by applying an electrode portion forming raw material containing a ceramic raw material to a side surface of the honeycomb fired body, and drying it to form a pair of unfired electrode portions on an outer surface of the outer peripheral wall across a central axis of the honeycomb fired body so as to extend in a form of strip in the flow passage direction of the cells, and firing the honeycomb fired body with unfired electrode portions to produce a conductive honeycomb structure having a pair of electrode portions.

(4) A method for producing an electrically heating support, wherein the method comprises a step of electrically connecting a metal electrode to each of the pair of electrode portions of the conductive honeycomb structure produced by the method according to (3).

According to the present invention, it is possible to provide a method for producing a conductive honeycomb structure and a method for producing an electrically heating support, which can stably form a desired electrical resistivity distribution in a honeycomb structure by a simple method.

BRIEF DESCRIPTION OF THE DRAWINGS

FIG. 4: each of FIG. 4 (a) and FIG. 4 (b) is a schematic view for explaining how a honeycomb formed body is extruded from a molding machine according to an embodiment of the present invention to form an irregularity pattern at a tip of the honeycomb formed body; and FIG. 5: each of FIG. 5 (a) to FIG. 5 (d) is a schematic cross-sectional view illustrating an example of an irregularity pattern at a tip of a honeycomb formed body extruded from a molding machine.

DETAILED DESCRIPTION OF THE INVENTION

Hereinafter, embodiments according to the present invention will be specifically described with reference to the drawings. It is to understand that the present invention is not limited to the following embodiments, and various design modifications and improvements may be made based on ordinary knowledge of a person skilled in the art, without departing from the spirit of the present invention.

(1. Honeycomb Structure)

Figure 1:
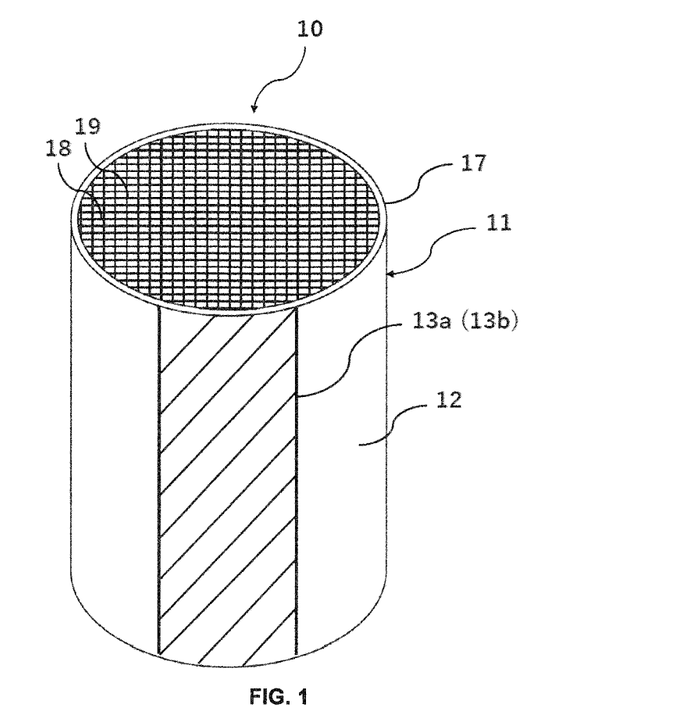
FIG. 1 is a schematic external view of a honeycomb structure according to an embodiment of the present invention.

FIG. 1 is a schematic external view of a honeycomb structure 10 according to an embodiment of the present invention. The honeycomb structure 10 includes a pillar shaped honeycomb structure portion 11 and electrode portions 13a, 13b. The honeycomb structure 10 may not include the electrode portions 13a, 13b.

(1-1. Pillar Shaped Honeycomb Structure Portion)

The pillar shaped honeycomb structure partition 11 includes: an outer peripheral wall 12; and a partition wall 19 which is disposed on an inner side of the outer peripheral wall 12 and define a plurality of cells 18 each extending from one end face to other end face to form a flow passage.

An outer shape of the pillar shaped honeycomb structure portion 11 is not particularly limited as long as it is pillar shaped. For example, the honeycomb structure portion can have a shape such as a pillar shape with circular end faces (cylindrical shape), a pillar shape with oval end faces, and a pillar shape with polygonal (quadrangular, pentagonal, hexagonal, heptagonal, octagonal, etc.) end faces. The size of the pillar shaped honeycomb structure portion 11 is such that an area of the end faces is preferably from 2000 to 20000 $mm^2$, and more preferably from 5000 to 15000 $mm^2$, for the purpose of improving heat resistance (suppressing cracks entering the outer peripheral wall in a circumferential direction).

The pillar shaped honeycomb structure portion 11 is made of a material selected from the group consisting of oxide ceramics such as alumina, mullite, zirconia and cordierite, and non-oxide ceramics such as silicon carbide, silicon nitride and aluminum nitride, although not limited thereto. Silicon carbide-metal silicon composite materials and silicon carbide-graphite composite materials may also be used. Among them, the material of the pillar shaped honeycomb structure portion 11 preferably contains ceramics mainly based on the silicon-silicon carbide composite material or on silicon carbide, in terms of achieving both heat resistant and electrical conductivity. The phrase "the pillar shaped honeycomb structure portion 11 is mainly based on a silicone-silicon carbide composite material" as used herein means that the pillar shaped honeycomb structure portion 11 contains 90% by mass or more of the silicon-silicon carbide composite material (total mass) based on the entire honeycomb structure portion. Here, the silicon-silicon carbide composite material contains silicon carbide particles as an aggregate and silicon as a bonding material for bonding the silicon carbide particles, and a plurality of silicon carbide particles are preferably bonded by silicon so as to form pores between the silicon carbide particles. The phrase "the pillar shaped honeycomb structure portion 11 is mainly based on silicon carbide" as used herein means that the pillar shaped honeycomb structure portion 11 contains 90% by mass or more of the silicon carbide (total mass) based on the entire honeycomb structure portion.

When the pillar shaped honeycomb structure portion 11 contains the silicon-silicon carbide composite material, a ratio of a "mass of silicon as a bonding material" contained in the pillar shaped honeycomb structure portion 11 to the total of a "mass of silicon carbide particles as an aggregate" contained in the pillar shaped honeycomb structure portion 11 and a "mass of silicon as a bonding material" contained in the pillar shaped honeycomb structure portion 11 is preferably from 10 to 40% by mass, and more preferably from 15 to 35% by mass.

A shape of each cell in a cross section perpendicular to an extending direction of the cells 18 is not limited, but it is preferably a quadrangle, a hexagon, an octagon, or a combination thereof. Among these, the quadrangle and the hexagon are preferred, in terms of easily achieving both structural strength and heating uniformity.

The partition wall 19 defining the cells 18 preferably has a thickness of from 0.1 to 0.3 mm, and more preferably from 0.15 to 0.25 mm. As used herein, the thickness of the partition wall 19 is defined as a length of a portion passing through the partition wall 19, among line segments connecting centers of gravity of the adjacent cells 18 in the cross section perpendicular to the extending direction of the cells 18.

The pillar shaped honeycomb structure portion 11 preferably has a cell density of from 40 to 150 cells/$cm^2$, and more preferably from 70 to 100 cells/$cm^2$, in the cross section perpendicular to the flow passage direction of the cells 18. The cell density in such a range can increase the purification performance of the catalyst while reducing the pressure loss upon flowing of an exhaust gas. The cell density is a value obtained by dividing the number of cells by an area of one end face of the pillar shaped honeycomb structure portion 11 excluding the outer peripheral wall 12 portion.

The provision of the outer peripheral wall 12 of the pillar shaped honeycomb structure portion 11 is useful in terms of ensuring the structural strength of the pillar shaped honeycomb structure portion 11 and preventing a fluid flowing through the cells 18 from leaking from the outer peripheral wall 12. More particularly, the thickness of the outer peripheral wall 12 is preferably 0.05 mm or more, and more preferably 0.1 mm or more, and even more preferably 0.15 mm or more. However, if the outer peripheral wall 12 is too thick, the strength becomes too high, so that a strength balance between the outer peripheral wall 12 and the partition wall 19 is lost to reduce thermal shock resistance. Also, the heat capacity increases to generate a temperature difference between the inner peripheral side and the outer peripheral side of the outer peripheral wall, so that the heat impact resistance decreases. From such viewpoints, the thickness of the outer peripheral wall 12 is preferably 1.0 mm or less, and more preferably 0.7 mm or less, and still more preferably 0.5 mm or less. As used herein, the thickness of the outer peripheral wall 12 is defined as a thickness of the outer peripheral wall 12 in a direction of a normal line to a tangential line at a measurement point when observing a portion of the outer peripheral wall 12 to be subjected to thickness measurement in the cross section perpendicular to the extending direction of the cells.

The partition wall 19 of the pillar shaped honeycomb structure portion 11 preferably has an average pore diameter of from 2 to 15 μm, and more preferably from 4 to 8 μm. The average pore diameter is a value measured by a mercury porosimeter.

The partition wall 19 has pores. The partition wall 19 preferably has a porosity of from 35 to 60%, and more preferably from 35 to 45%. The porosity is a value measured by a mercury porosimeter.

Figure 2:
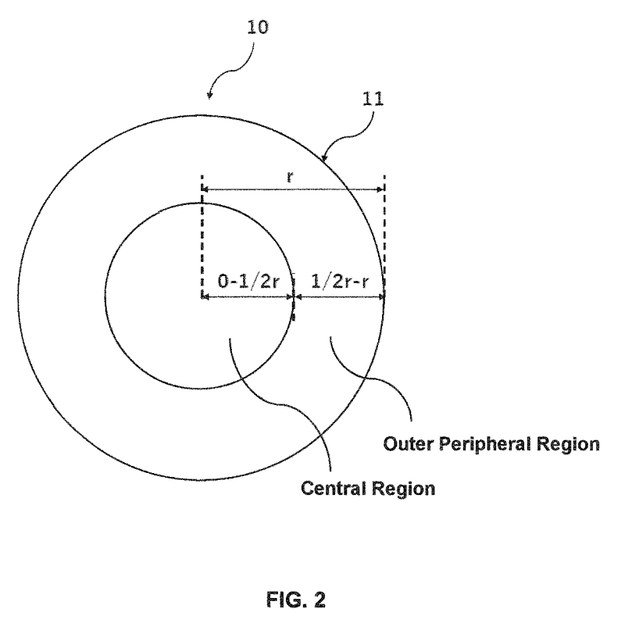
FIG. 2 is a schematic cross-sectional view for explaining a "central region" and an "outer peripheral region" of a honeycomb structure (fired body) according to an embodiment of the present invention.

As shown in FIG. 2, in a cross section perpendicular to a flow passage direction of the cells 18, the honeycomb structure 10 may be configured such that an absolute value of a difference between a porosity of a central region from the center to ½r of the cross section and a porosity of a peripheral region from ½r to r is within 0.5%, in which r is a radius of the cross section of the honeycomb structure 10. FIG. 2 shows a simplified outer shape of the cross section of the honeycomb structure 10, and omits the cells 18, the partition wall 19 and the outer peripheral wall 12, and the like. According to such a configuration of the honeycomb structure 10, the porosity of the outer region (outer peripheral region) is controlled to the defined numerical value range relative to the porosity of the inner region (central region) from the center in the radial direction in the cross section perpendicular to the flow passage direction of the cells 18, so that an electrical resistivity of the outer peripheral region can be controlled to the defined range relative to an electrical resistivity of the central region. Therefore, when the honeycomb structure 10 is used for the EHC, it is possible to obtain a desired effect of reducing an energy used to purify the exhaust gas by applying a voltage, or suppressing the deviation of the heat generation distribution and achieving uniform heat generation, or the like, as needed.

The difference between the porosity of the central region from the center to ½r of the cross section and the porosity of the outer peripheral region from ½r to r may be −0.5% or less, +0.5% or more, or −1% or less, +1% or more. It means that the absolute value of the difference between the porosity of the central region from the center to ½r of the cross section and the porosity of the peripheral region from ½r to r is preferably 0.5% or more, and more preferably 1% or more. The difference between the porosities of the central region and the outer peripheral region enables optimization of the strength distribution in the honeycomb structure 10 in terms of thermal durability. The upper limit is not particular limited, but it may be −5% or more, +5% or less.

The pillar shaped honeycomb structure portion 11 is made of ceramics, and has electrical conductivity. Electrical resistivity of the ceramics is not particularly limited as long as the pillar shaped honeycomb structure portion 11 can generate heat by Joule heat upon electrical conduction. The electrical resistivity is preferably from 0.1 to 200 Ωcm, and more preferably from 1 to 200 Ωcm. As used herein, the electrical resistivity of the pillar shaped honeycomb structure portion 11 is a value measured at 400° C. by a four-terminal method.

An electrical resistivity distribution in the honeycomb structure 10 may optionally be controlled to a desired distribution state. For the electrical resistivity distribution in the honeycomb structure 10, an electrical resistivity distribution of the outer peripheral region from ½r to r may be controlled to a predetermined range relative to an electrical resistivity of the central region from the center to ½r, in which r is the radius of the cross section of the honeycomb structure 10, in the cross section perpendicular to the flow passage direction of the cells 18. Such a configuration can provide a desired effect of reducing the energy used to purify the exhaust gas by applying the voltage, or suppressing the deviation of the heat generation distribution and achieving uniform heat generation, or the like, when the honeycomb structure 10 is used for the EHC. Further, the electrical resistivity distribution in the honeycomb structure 10 may be controlled so that the electrical resistivity of the central region is lower than that of the outer peripheral region in a cross section orthogonal to the extending direction of the cells 18, in order to reduce the energy used when applying the voltage to purify the exhaust gas, as disclosed in Patent Literature 1, for example. Also, as disclosed in Patent Literature 2, the electrical resistivity distribution in the honeycomb structure 10 may be controlled so that the honeycomb structure 10 is composed of an outer peripheral region including a side surface, a central region that is a region at the center, and an intermediate region excluding the outer peripheral region and the central region, an average electrical resistivity A of a material forming the outer peripheral region, an average electrical resistivity B of a material forming the central region, and an average electrical resistivity C of a material forming the intermediate region satisfy the relationship: A≤B<C, in order to suppress deviation of the heat generation distribution and to achieve uniform heat generation. In addition to those configurations, the electrical resistivity distribution in the honeycomb structure 10 may be controlled to be uniform, or may be controlled to various other electrical resistivity distributions according to purposes. In the present invention, the electrical resistivity distribution in the plane can be measured by collecting a sample from each region in the honeycomb structure 10, and measuring the electrical resistivity of each sample and mapping it using a four-terminal method or the like.

(1-2. Electrode Portion)

The honeycomb structure 10 according to an embodiment of the present invention includes a pair of electrode portions 13a, 13b on an outer surface of the outer peripheral wall 12 across a central axis of the pillar shaped honeycomb structure portion 11 so as to extend in a form of strip in the flow passage direction of the cells 18. By thus providing the pair of electrode portion 13a, 13b, uniform heat generation of the honeycomb structure can be enhanced. It is desirable that each of the electrode portions 13a, 13b extends over a length of 80% or more, and preferably 90% or more, and more preferably the full length, between both end faces of the honeycomb structure, from the viewpoint that a current easily spreads in an axial direction of each of the electrode portions 13a, 13b. It should be noted that the honeycomb structure may not include the electrode portions 13a, 13b.

Each of the electrode portions 13a, 13b preferably has a thickness of from 0.01 to 5 mm, and more preferably from 0.01 to 3 mm. Such a range can allow uniform heat generation to be enhanced. The thickness of each of the electrode portions 13a, 13b is defined as a thickness in a direction of a normal line to a tangential line at a measurement point on an outer surface of each of the electrode portions 13a, 13b when observing the point of each electrode portion to be subjected to thickness measurement in the cross section perpendicular to the extending direction of the cells.

The electric resistivity of each of the electrode portions 13a, 13b is lower than the electric resistivity of the pillar shaped honeycomb structure portion 11, whereby the electricity tends to flow preferentially to the electrode portions 13a. 13b, and the electricity tends to spread in the flow passage direction and the circumferential direction of the cells 18 during electric conduction. The electric resistivity of the electrode portions 13a, 13b is preferably $1/10$ or less, and more preferably $1/20$ or less, and even more preferably $1/30$ or less, of the electric resistivity of the pillar shaped honeycomb structure portion 11. However, if the difference in electric resistivity between both becomes too large, the current is concentrated between ends of the opposing electrode portions to bias the heat generated in the pillar shaped honeycomb structure portion 11. Therefore, the electric resistivity of the electrode portions 13a, 13b is preferably $1/200$ or more, and more preferably $1/150$ or more, and even more preferably $1/100$ or more, of the electric resistivity of the pillar shaped honeycomb structure portion 11. As used herein, the electric resistivity of the electrode portions 13a, 13b is a value measured at 25° C. by a four-terminal method.

Each of the electrode portions 13a, 13b may be made of conductive ceramics, a metal, and a composite of a metal and conductive ceramics (cermet). Examples of the metal include a single metal of Cr, Fe, Co, Ni, Si or Ti, or an alloy containing at least one metal selected from the group consisting of those metals. Non-limiting examples of the conductive ceramics include silicon carbide (SiC), metal compounds such as metal silicides such as tantalum silicide ($TaSi_2$) and chromium silicide ($CrSi_2$). Specific examples of the composite of the metal and the conductive ceramics (cermet) include a composite of metal silicon and silicon carbide, a composite of metal silicide such as tantalum silicide and chromium silicide, metal silicon and silicon carbide, and further a composite obtained by adding to one or more metals listed above one or more insulating ceramics such as alumina, mullite, zirconia, cordierite, silicon nitride, and aluminum nitride, in terms of decreased thermal expansion.

(2. Electrically Heating Support)

Figure 3:
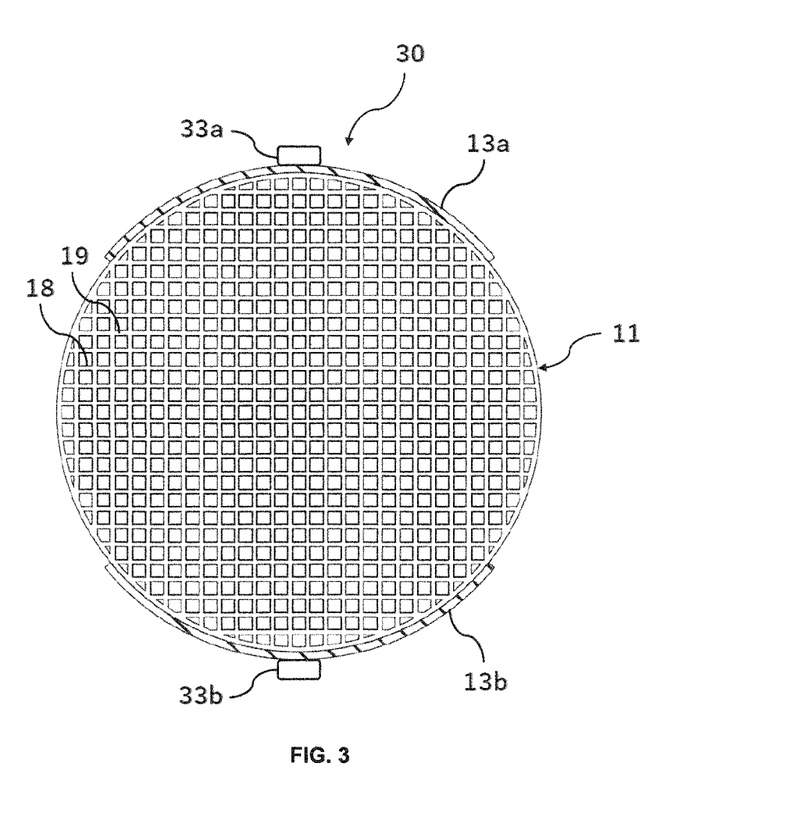
FIG. 3 is a schematic cross-sectional view of an electrically heating support according to an embodiment of the present invention, which is perpendicular to an extending direction of cells.

FIG. 3 is a schematic cross-sectional view of an electrically heating support 30 according to an embodiment of the present invention, which is perpendicular to the extending direction of the cells. The electrically heating support 30 includes: the honeycomb structure 10; and metal electrodes 33a, 33b electrically connected to the electrode portions 13a, 13b of the honeycomb structure 10, respectively.

(2-1. Metal Electrode)

Metal electrodes 33a, 33b are provided on the electrode portions 13a, 13b of the honeycomb structure 10. The metal electrode 33a, 33b may be a pair of metal electrode such that one metal electrode 33a is disposed so as to face the other metal electrode 33b across the central axis of the pillar shaped honeycomb structure portion 11. As a voltage is applied to the metal electrodes 33a, 33b through the electrode portions 13a, 13b, then the electricity is conducted through the metal electrodes 33a, 33b to allow the pillar shaped honeycomb structure portion 11 to generate heat by Joule heat. Therefore, the electrically heating support 30 can also be suitably used as a heater. The applied voltage is preferably from 12 to 900 V, and more preferably from 48 to 600 V, although the applied voltage may be changed as needed.

The material of the metal electrodes 33a, 33b is not particularly limited as long as it is a metal, and a single metal, an alloy, or the like can be employed. In terms of corrosion resistance, electrical resistivity and linear expansion coefficient, for example, the material is preferably an alloy containing at least one selected from the group consisting of Cr, Fe, Co, Ni and Ti, and more preferably stainless steel and Fe—Ni alloys. The shape and size of each of the metal electrodes 33a, 33b are not particularly limited, and they can be appropriately designed according to the size of the electrically heating support 30, the electrical conduction performance, and the like.

By supporting the catalyst on the electrically heating support 30, the electrically heating support 30 can be used as a catalyst. For example, a fluid such as an exhaust gas from a motor vehicle can flow through the flow passages of the plurality of cells 18 of the honeycomb structure 10. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a NOx storage reduction catalyst (LNT catalyst) containing an alkaline earth metal and platinum as storage components for nitrogen oxides (NOx). Illustrative examples of a catalyst that does not use the noble metal include a NOx selective reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure.

(3. Method for Producing Honeycomb Structure)

Next, a method for producing the honeycomb structure 10 according to an embodiment of the present invention will be described. The honeycomb structure 10 according to an embodiment of the present invention can be produced by either a production method according to Embodiment 1, which controls the porosity (volume fraction of the portion that can form pores) in a forming step, or a production method according to Embodiment 2, which controls the porosity (volume fraction of the portion that can form pores) in a drying step.

Production Method According to Embodiment 1

The method for producing the honeycomb structure 10 according to Embodiment 1 of the present invention includes: a forming step of obtaining a honeycomb formed body; a drying step of obtaining a honeycomb dried body; and a firing step of obtaining a honeycomb fired body.

(Forming Step)

In the forming step, first, a forming raw material containing a conductive ceramic raw material is prepared. For example, the forming raw material is prepared by adding metal silicon powder (metal silicon), a binder, a surfactant(s), a pore former, water, and the like to silicon carbide powder (silicon carbide). It is preferable that a mass of metal silicon is from 10 to 40% by mass relative to the total of mass of silicon carbide powder and mass of metal silicon. The average particle diameter of the silicon carbide particles in the silicon carbide powder is preferably from 3 to 50 µm, and more preferably from 3 to 40 µm. The average particle diameter of the metal silicon (the metal silicon powder) is preferably from 2 to 35 µm. The average particle diameter of each of the silicon carbide particles and the metal silicon (metal silicon particles) refers to an arithmetic average diameter on volume basis when frequency distribution of the particle size is measured by the laser diffraction method. The silicon carbide particles are fine particles of silicon carbide forming the silicon carbide powder, and the metal silicon particles are fine particles of metal silicon forming the metal silicon powder. It should be noted that this is the formulation of the forming raw material in the case where the material of the honeycomb structure is the silicon-silicon carbide composite material, and when the material of interest is silicon carbide, no metal silicon is added.

Examples of the binder include methyl cellulose, hydroxypropylmethyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass when the total mass of the silicon carbide powder and the metal silicon powder is 100 parts by mass.

The content of water is preferably from 20 to 60 parts by mass when the total mass of the silicon carbide powder and the metal silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2.0 parts by mass when the total mass of the silicon carbide powder and the metal silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.5 to 10.0 parts by mass when the total mass of the silicon carbide powder and the metal silicon powder is 100 parts by mass. An average particle diameter of the pore former is preferably from 10 to 30 µm. The average particle diameter of the pore former refers to an arithmetic average diameter on volume basis when frequency distribution of the particle size is measured by the laser diffraction method. When the pore former is the water absorbing resin, the average particle diameter of the pore former refers to an average particle diameter after water absorption.

The resulting forming raw material is then kneaded to form a green body (hereinafter, also called a kneaded material), and the green body is then extruded to prepare a honeycomb fired body. The honeycomb formed body includes: the outer peripheral wall; and the partition wall which is disposed on the inner side of the outer peripheral wall and define the plurality of cells to form the flow passage extending from one end face to the other end face.

The forming step includes a step of controlling a volume fraction of a portion that can form pores in the honeycomb formed body so that an absolute value of a difference in volume fraction of the portion that can form the pores in predetermined regions of the honeycomb formed body relative to a previously set, predetermined porosity of the honeycomb fired body is within 0.5%. The predetermined porosity refers to a porosity preset for each of the predetermined regions in the cross section perpendicular to the flow passage direction of the cells of the honeycomb fired body. Here, the previously set, predetermined porosity is a desired porosity in the predetermined regions of the honeycomb structure finally obtained after the firing step, and specifically, the porosity is set in a range of from 35 to 60%. According to such a configuration, the volume fraction of the portion that can form the pores in the predetermined regions is controlled in the forming step, so that the porosity in the predetermined regions of the honeycomb structure finally obtained after the firing step can be controlled. As the result, the electrical resistivity in the predetermined regions can be controlled. Thus, the electrical resistivity is adjusted by controlling the volume fraction distribution of the portion that can form the pores in the honeycomb formed body in the forming step, rather than by adjusting the electrical resistivity in the firing step which would otherwise be affected by a variation in an atmosphere or temperature. Therefore, the desired electrical resistivity distribution can be stably formed in the honeycomb structure by a simple method. Further, since it is not necessary to control the porosity inside the honeycomb structure in the firing step, it is possible to suppress any consumption of firing tools such as enclosures, shelf boards on which products are placed, sands (mesh sands) laid on the shelf boards, and lids (top plates) placed on the enclosures, which are used during the firing step. Further, the volume fraction can be controlled so that the previously set, predetermined porosity is set for each predetermined region, and the absolute value of the difference between the previously set, predetermined porosity and the volume fraction of the portion that can form the pores in the predetermined regions of the honeycomb formed body is within 0.5%, whereby the desired porosity distribution can be formed in the finally obtained honeycomb structure. As a result, the desired electrical resistivity distribution can be formed in the honeycomb structure. Further, since the porosity of the honeycomb structure is distributed in the predetermined form, it is possible to form desired distribution states of material properties such as strength and Young's modulus.

The volume fraction of the portion that can form the pores in the honeycomb formed body refers to a volume fraction of the portion that will form the pores in a fired body produced by drying and further firing the honeycomb formed body (a porosity of the honeycomb fired body). The portion that will form the pores in the fired body correspond to the pores, pore former, moisture, and the like at the stage of the honeycomb formed body. Thus, the volume fraction of the portion that can form the pores in the honeycomb formed body refers to a volume fraction of the total of the pores, pore former and moisture contained in the honeycomb formed body in the predetermined regions of the honeycomb formed body.

To measure the volume fraction of the portion that can form the pores in the predetermined regions of the honeycomb formed body, first, samples are cut out from the predetermined regions of the honeycomb formed body, and the samples are then dried and fired to obtain fired body samples. A porosity of each fired body sample was then measured by measurement with a mercury porosimeter, calculation of a pore area ratio from an image by SEM (scanning electron microscope), or the like, and the porosity was defined as the volume fraction of the portion that can form the pores in each predetermined region of the honeycomb formed body. The drying and firing conditions when producing the fired body sample are the same as the drying and firing conditions when producing a honeycomb fired body as described later.

The "predetermined regions" as described above are not particularly limited. For example, in the cross section perpendicular to the flow passage direction of the cells, a central region and an outer peripheral region which will be described below, one semicircular region and other semicircular region, or island-shaped regions and other regions, or the like, may be appropriately designed according to the purpose. By finely setting the predetermined regions, a finer electrical resistivity distribution can be formed.

Further, in the cross section perpendicular to the flow passage direction of the cells of the honeycomb fired body, the predetermined regions may have a central region from the center to ½r of the cross section, and an outer peripheral region from ½r to r, in which r is a radius of the cross section. By the step of thus setting the predetermined regions and controlling the volume fraction of the portion that can form the pores of the honeycomb formed body, the absolute value of the difference in the volume fraction of the portion that can form the pores in each of the central region and the outer peripheral region of the honeycomb formed body relative to the previously set, predetermined porosity of each of the central region and the outer peripheral region of the honeycomb fired body may be controlled to be within 0.5%. According to such a configuration, the finally obtained honeycomb structure has a volume fraction controlled within the defined range for the portion that can form the pores of the outer region (outer peripheral region) relative to the porosity of the inner region (central region) from the center in the radial direction in the cross section perpendicular to the flow passage direction of the cells, so that the electrical resistivity of the outer peripheral region can be controlled within the predetermined range relative to the electrical resistivity of the central region. Therefore, when the honeycomb structure is used for the EHC, it is possible to obtain the desired effect of reducing the energy to purify the exhaust gas by applying the voltage, or suppressing the deviation of the heat generation distribution and achieving uniform heat generation, or the like, as needed.

The control of the volume fraction of the portion that can form the pores in the predetermined regions of the honeycomb formed body as described above can be carried out by 1) controlling the density distribution in the kneaded material, or 2) controlling the density distribution in the honeycomb formed body, as illustrated below. The controls (1) and (2) may be used in combination.

1) Control of Density Distribution in Kneaded Material

The control of the density distribution in the kneaded material can allow for control of the volume fraction of the portion that can form the pores in the predetermined regions of the honeycomb formed body. The kneaded material is made of clay, intrinsic moisture, and intrinsic air, and is prepared using a kneading machine. The kneaded material preferably has a density of from 1.5 to 2.2 g/cm$^3$, and more preferably from 1.7 to 2.0 g/cm$^3$, in terms of controlling the volume fraction of the portion that can form the pores in the predetermined regions of the honeycomb formed body. The method of controlling the density of the kneaded material in the above range includes, for example, controlling a rotation speed of a screw used for the kneading machine, a degree of vacuum in the kneading machine, and/or a temperature distribution in the kneading machine. By controlling the intrinsic air content in the kneaded material to the predetermined region using those methods, the volume fraction of the portion that can form the pores in the predetermined regions of the honeycomb formed body can be controlled. Further, by controlling the rotation speed of the screw, the degree of vacuum in the kneading machine, and the temperature distribution in the kneading machine, the pore former contained in the clay can be intentionally unevenly distributed in the kneaded material to control the volume fraction of the portion that can form the pores in the predetermined regions of the honeycomb formed body. By controlling the rotation speed of the screw used for the kneading machine, a percentage of air bubbles in the predetermined regions in the kneaded material can be controlled. The rotation speed of the screw used for the kneading machine is not particularly limited, but it may be selected depending on the desired density distribution in the kneaded material. For example, the rotation speed can be from 600 to 3,000 rpm.

By controlling the degree of vacuum in the kneading machine, it is possible to control the percentage of the intrinsic air in the predetermined regions in the kneaded material. The degree of vacuum in the kneading machine is not particularly limited, but it may be appropriately selected depending on the desired density distribution in the kneaded material. For example, it may be from −0.09 to −0.10 Pa.

By controlling the temperature distribution in the kneading machine, it is possible to control the percentage of the intrinsic air in the predetermined regions in the kneaded material. The temperature distribution in the kneading machine can be controlled by adjusting a temperature of a chiller (a cooling water circulation device) in the kneading machine or a flow rate of the cooling water. The temperature of the chiller in the kneading machine is not particularly limited, but it may be from −10 to 20° C. The flow rate of the cooling water is not particularly limited, but it may be from 5 to 30 m$^3$/s.

2) Control of Density Distribution in Honeycomb Formed Body

By controlling the density distribution in the honeycomb formed body, it is possible to control the volume fraction of the portion that can form the pores in the predetermined regions of the honeycomb formed body. By using a molding machine including a die to extrude a forming raw material and control an irregularity pattern at a tip of the honeycomb formed body extruded from the molding machine, an amount and flow rate of the clay extruded from the molding machine can be controlled, so that the volume fraction of the portion that can form the pores in the predetermined regions of the honeycomb formed body can be controlled.

Examples of the method of controlling the irregularity pattern at the tip of the honeycomb formed body extruded from the molding machine include controlling a temperature distribution in the molding machine, a length of a drawing jig in a green body passage direction, which is provided on an upstream side of the die in the passage of the green body, a hole diameter of a back plate and arrangement of pitches, and/or a length of the honeycomb formed body.

Figure 4:
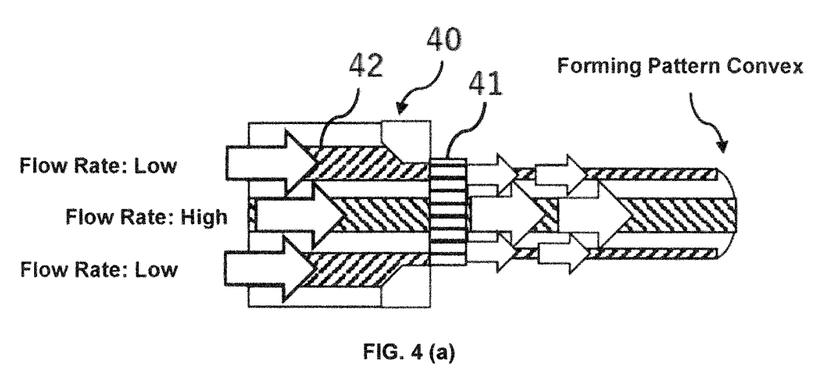

As shown in FIGS. 4 (*a*) and (*b*), the control of the irregularity pattern at the tip of the honeycomb formed body formed by extruding a green body 42 from a molding machine 40 causes a difference between flow rates in an extruding direction in the interior of the honeycomb formed body extruded from the molding machine 40. If the tip of the honeycomb formed body extruded from the molding machine 40 is convex, as shown in FIG. 4 (*a*), the flow rate and amount of the green body at the central portion of the honeycomb formed body extruded from the die 41 increase and the porosity decreases, in the cross section perpendicular to the flow passage direction of the cells. On the other hand, if the tip of the honeycomb formed body extruded from the molding machine 40 is concave, as shown in FIG. 4 (*b*), the flow rate and amount of the green body decrease at the central portion of the honeycomb formed body extruded from the die 41 and the porosity increases, in the cross section perpendicular to the flow passage direction of the cells.

Figure 5:
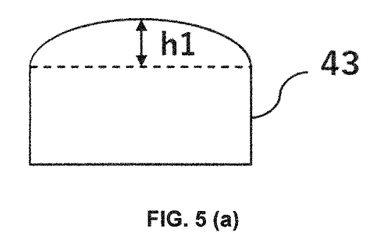

The irregularity pattern at the tip of the honeycomb formed body extruded from the molding machine is not particularly limited, but it may be appropriately designed depending on the desired density distribution in the honeycomb formed body. Examples of the irregularity pattern at the tip of the honeycomb formed body extruded from the molding machine are shown in FIG. 5 (*a*) to FIG. 5 (*d*). FIG. 5 (*a*) shows a pattern in which the center of the tip of the honeycomb formed body 43 is raised, FIG. 5 (*b*) shows a pattern in which the center of the tip of the honeycomb formed body 43 is depressed, FIG. 5 (*c*) shows a pattern in which the tip of the honeycomb formed body 43 is inclined, and FIG. 5 (*d*) shows a pattern in which the tip of the honeycomb formed body 43 has irregularities.

The irregularity pattern at the tip of the honeycomb formed body extruded from the molding machine may be formed as needed, by adjusting the size of the hole diameter and its distribution state of the back plate, net, and/or a pressing plate (back presser) on a back side of the die, and the like.

By controlling the temperature distribution in the molding machine, the percentage of the intrinsic air in the honeycomb formed body can be controlled, thereby controlling the density distribution. The temperature distribution in the molding machine can be controlled by adjusting the temperature of the chiller (cooling water circulation device) in the molding machine or the flow rate of the cooling water. The temperature of the chiller in the molding machine is not particularly limited, but it may be from −10 to 20° C. The flow rate of the cooling water is not particularly limited, but it may be from 5 to 30 m$^3$/s.

By controlling the length of the drawing jig in the passage direction of the green body (forming raw material), which is provided on the upstream side of the die in the passage of the green body, the density distribution in the honeycomb formed body can be controlled. A longer length of the green body after drawing with the drawing jig in the passage direction can result in a longer conveying time, and in particular, an increased moisture scattering rate in the outer peripheral region, thereby controlling the density distribution in the honeycomb formed body. The length of the green body in the passage direction is not particularly limited, but it may be from 10 to 20 cm. Further, by controlling a ratio of a diameter to a length of the drawn green body in the passage direction, the outer shape of the formed body can be designed as needed, thereby finely controlling the moisture scattering rate. The ratio (A/B) of the diameter (A) to the length (B) of the drawn green body in the passage direction is not particularly limited, but it may be from 0.8 to 1.5 times.

By controlling the length of the honeycomb molded body, the density distribution in the honeycomb formed body can be controlled. A longer honeycomb formed body can result in a longer conveying time, and in particular, an increased moisture scattering rate in the outer peripheral region, thereby controlling the density distribution in the honeycomb formed body.

(Drying Step)

The resulting honeycomb formed body is then dried to produce a honeycomb dried body. The drying method is not particularly limited. Examples include electromagnetic wave heating methods such as microwave heating/drying and high-frequency dielectric heating/drying, and external heating methods such as hot air drying and superheated steam drying. Among them, it is preferable to dry a certain amount of moisture by the electromagnetic wave heating method and then dry the remaining moisture by the external heating method, in terms of being able to dry the entire molded body quickly and evenly without cracking. As for conditions of drying, it is preferable to remove 30 to 99% by mass of the water content before drying by the electromagnetic wave heating method, and then reduce the water content to 3% by mass or less by the external heating method. The dielectric heating/drying is preferable as the electromagnetic heating method, and hot air drying is preferable as the external heating method. The drying temperature may preferably be from 50 to 120° C.

(Firing Step)

The resulting honeycomb dried body is then fired to produce a honeycomb fired body. As the firing conditions, the honeycomb dried body is preferably heated in an inert atmosphere such as nitrogen or argon at 1400 to 1500° C. for 1 to 20 hours. After firing, an oxidation treatment is preferably carried out at 1200 to 1350° C. for 1 to 10 hours in order to improve durability. The methods of degreasing and firing are not particularly limited, and they can be carried out using an electric furnace, a gas furnace, or the like.

The honeycomb fired body may be used as a honeycomb structure as it is, or electrode portions may be provided on a side surface of the honeycomb fired body to produce a honeycomb structure having the electrode portions. The method for producing the honeycomb structure with electrode portions is carried out by, first, applying the electrode portion forming raw material containing the ceramic raw material to the side surface of the honeycomb fired body and drying it to obtain a pair of unfired electrode portions on the outer surface of the outer peripheral wall, across the central axis of the honeycomb fired body, so as to extend in the form of strip in the flow direction of the cells, thereby providing a honeycomb fired body with unfired electrode portions. The honeycomb fired body with unfired electrode portions is then fired to provide a honeycomb structure having a pair of electrode portions. The electrode portions may be formed by applying the electrode portion forming raw material to the honeycomb dried body, rather than the honeycomb fired body, drying it to form the unfired electrode portions, which may be then fired to the honeycomb fired body with the electrode portions.

The electrode portion forming raw material can be formed by appropriately adding and kneading various additives to raw material powder (metal powder, and/or ceramic powder, and the like) formulated according to required characteristics of the electrode portions. When each electrode portion is formed as a laminated structure, the joining strength between each metal terminal and each electrode portion tends to be improved by increasing an average particle diameter of the metal powder in the paste for the second electrode portion, as compared with an average particle diameter of the metal powder in the paste for the first electrode portion. The average particle diameter of the metal powder refers to an arithmetic average diameter on volume basis when frequency distribution of the particle diameter is measured by the laser diffraction method.

The method for preparing the electrode portion forming raw material and the method for applying the electrode portion forming raw material to the honeycomb fired body can be performed according to a known method for producing a honeycomb structure. However, in order to achieve lower electrical resistivity of the electrode portions than that of the honeycomb structure portion, it is possible to increase a metal content ratio or to decrease the particle diameter of the metal particles as compared with the honeycomb structure portion.

Before firing the honeycomb fired body with unfired electrode portions, the honeycomb fired body with unfired electrode portions may be dried. Also, prior to the firing, degreasing may be carried out in order to remove the binder and the like. As the firing conditions for the honeycomb fired body with unfired electrode portions, the honeycomb fired body with unfired electrode portions is preferably heated in an inert atmosphere such as nitrogen and argon at 1400 to 1500° C. for 1 to 20 hours. After firing, an oxidation treatment is preferably carried out at 1200 to 1350° C. for 1 to 10 hours in order to improve durability. The methods of degreasing and firing are not particularly limited, and they can be carried out using an electric furnace, a gas furnace, or the like.

Production Method According to Embodiment 2

The method for producing the honeycomb structure according to Embodiment 2 of the present invention includes: a forming step of obtaining a honeycomb formed body; a drying step of obtaining a honeycomb dried body; and a firing step of obtaining a honeycomb fired body.
(Forming Step)

In the forming step, first, the same forming raw material as that of the above method for producing the honeycomb structure according to Embodiment 1 is used and extruded the forming raw material to produce a honeycomb formed body including: an outer peripheral wall; and a partition wall which is disposed on an inner side of the outer peripheral wall and define a plurality of cells to form a flow passage extending from one end face to the other end face. In the method for producing the honeycomb structure according to Embodiment 2, the volume fraction of the portion that can form the pores is controlled in the subsequent drying step, without controlling the volume fraction of the portion that can form the pores in the forming step.
(Drying Step)

The obtained honeycomb formed body is then dried to produce a honeycomb dried body. The drying step includes a step of controlling a volume fraction of a portion that can form pores in the honeycomb dried body so that an absolute value of a difference in volume fraction of the portion that can form pores in predetermined regions of the honeycomb dried body relative to a previously set, predetermined porosity of the honeycomb dried body is within 0.5%. The predetermined porosity refers to a porosity preset for each predetermined region in the cross section perpendicular to the flow passage direction of the cells of the honeycomb dried body. According to such a configuration, the volume fraction of the portion that can form the pores in the predetermined region is controlled in the drying step, so that the porosity in the predetermined regions of the honeycomb structure finally obtained can be controlled, and as a result, the electrical resistivity in the predetermined regions can be controlled. Thus, the electrical resistivity is adjusted by controlling the volume fraction distribution of the portion that can form the pores in the drying step, rather than by adjusting the electrical resistivity in the firing step which would otherwise be affected by a variation in an atmosphere or temperature. Therefore, the desired electrical resistivity distribution can be stably formed in the honeycomb structure by a simple method. Further, since it is not necessary to control the porosity inside the honeycomb structure in the firing step, it is possible to suppress any consumption of firing tools such as enclosures, shelf boards on which products are placed, sands (mesh sands) laid on the shelf boards, and lids (top plates) placed on the enclosures, which are used during the firing step. Further, the volume fraction can be controlled so that the previously set, predetermined porosity is set for each predetermined region, and the absolute value of the difference between the previously set, predetermined porosity and the volume fraction of the portion that can form the pores in the predetermined region of the honeycomb dried body is within 0.5%, whereby the desired porosity distribution can be formed in the finally obtained honeycomb structure. As a result, the desired electrical resistivity distribution can be formed in the honeycomb structure. Further, since the porosity of the honeycomb structure is distributed in the predetermined form, it is possible to form desired distribution states of material properties such as strength and Young's modulus.

The volume fraction of the portion that can form the pores in the honeycomb dried body refers to a volume fraction of the portion that will form the pores in a fired body produced by firing the honeycomb dried body (a porosity of the honeycomb fired body). The portion that will form the pores in the fired body correspond to pores, pore former, moisture, and the like at the stage of the honeycomb dried body. Thus, the volume fraction of the portion that can form the pores in the honeycomb dried body refers to a volume fraction of the total of the pores, pore former and moisture contained in the honeycomb dried body in the predetermined region of the honeycomb dried body.

Further, as the predetermined regions as described above, in the cross section perpendicular to the flow passage direction of the cells of the honeycomb fired body, the predetermined regions may have a central region from the center to ½r of the cross section, and an outer peripheral region from to ½r to r, in which r is a radius of the cross section. By the step of thus setting the predetermined regions and controlling the volume fraction of the portion that can form the pores of the honeycomb dried body, the absolute value of the difference in volume fraction of the portion that can form the pores in each of the central region and the outer peripheral region of the honeycomb dried body relative to the previously set, predetermined porosity of each of the central region and the outer peripheral region of the honeycomb fired body may be controlled to be within 0.5%. According to such a configuration, the finally obtained honeycomb structure has a volume fraction controlled within the defined numerical value range for the portion that can form the pores of the outer region (outer peripheral region) relative to the porosity of the inner region (central region) from the center in the radial direction in the cross section perpendicular to the flow passage direction of the cells, so that the electrical resistivity of the outer peripheral region can be controlled within the predetermined range relative to the electrical resistivity of the central region. Therefore, when the honeycomb structure is used for the EHC, it is possible to obtain the desired effect of reducing the energy to purify the exhaust gas by applying the voltage, or suppressing the deviation of the heat generation distribution and achieving uniform heat generation, or the like, as needed.

The control of the volume fraction of the portion that can form the pores in the predetermined region of the honeycomb dried body as described above can be carried out by 1) controlling a moisture scattering rate of the honeycomb formed body. Further, the above control 1) may be carried out by 2) controlling a distance between electrodes of parallel plate electrodes used in drying with dielectric heating, or 3) controlling a drying time of the honeycomb formed body, which are illustrated below. The controls (2) and (3) may be used in combination.

1) Control of Moisture Scattering Rate of Honeycomb Formed Body

By controlling the moisture scattering rate of the honeycomb formed body, it is possible to control the volume fraction of the portion that can form the pores in the predetermined region of the honeycomb dried body. Specifically, in addition to the controls in (2) and (3) above, the relative humidity and wet-bulb temperature in a furnace can be controlled in the drying step to control the moisture scattering rate in the predetermined regions of the honeycomb formed body, thereby controlling the volume fraction of the portion that can form the pores in the predetermined regions of the honeycomb dried body.

2) Control of Distance Between Electrodes of Parallel Plate Electrode Used in Drying with Dielectric Heating By controlling a distance between electrodes of parallel plate electrodes used in drying with dielectric heating, it is possible to control the volume fraction of the portion that can form the pores in the predetermined regions of the honeycomb dried body. Specifically, the distance between the electrodes of the parallel plate electrodes can be decreased to increase the moisture scattering rate of the honeycomb formed body. Further, the distance between the electrodes of the parallel plate electrodes can be increased to decrease the moisture scattering rate of the honeycomb formed body. By thus controlling the moisture scattering rate in the honeycomb formed body, it is possible to control the volume fraction of the portion that can form the pores in the predetermined region of the honeycomb dried body. The distance between the electrodes of the parallel plate electrodes is not particularly limited, but it may be appropriately designed depending on the desired moisture scattering rate. For example, the distance may be controlled so as to be higher by 5 to 150 mm than a honeycomb cover member provided so as to cover the honeycomb dried body, or it may be controlled so as to be higher by 20 to 40 mm than the honeycomb cover member.

3) Control of Drying Time of Honeycomb Formed Body

By controlling a drying time of the honeycomb formed body during the drying step, it is possible to control the volume fraction of the portion that can form the pores in the predetermined regions of the honeycomb dried body. Specifically, a longer drying time of the honeycomb formed body can result in an increased moisture scattering rate, particularly in the outer peripheral region. Further, a shorter drying time of the honeycomb formed body can suppress the moisture scattering rate, particularly in the outer peripheral region. By thus controlling the moisture scattering rate in the honeycomb formed body, it is possible to control the volume fraction of the portion that can form the pores in the predetermined regions of the honeycomb dried body. The drying time of the honeycomb formed product is not particularly limited, but it may be appropriately designed depending on the desired moisture scattering rate. For example, it may be from 10 to 180 minutes or from 15 to 30 minutes. Further, the drying time can be adjusted, for example, by controlling a conveying speed of the honeycomb formed body. A lower conveying speed of the honeycomb formed body can result in a longer conveying time and a longer drying time. Further, a higher conveying speed of the honeycomb formed body can result in a shorter conveying time and a shorter drying time. The conveying speed of the honeycomb formed product is not particularly limited, but it may be appropriately designed depending on the desired moisture scattering rate. For example, it may be from 50 to 400 mm/min or from 150 to 200 mm/min.

In the drying step, the drying method is not particularly limited, with the exception that the control of any one of (1) to (3) as described above is carried out. Examples of the drying method include an electromagnetic wave heating method such as microwave heating/drying and high frequency dielectric heating/drying, and an external heating method such as hot air drying and superheated steam drying. Among them, it is preferable that a certain amount of moisture is dried by the electromagnetic wave heating method, and the remaining moisture is then dried by the external heating method, because the entire formed body can be rapidly and uniformly dried without causing cracks. As for drying conditions, from 30 to 99% by mass of moisture is preferably removed by the electromagnetic wave heating method, and the moisture content is then reduced to be 3% by mass or less by the external heating method, with respect to the moisture content before drying. The electromagnetic wave heating method may preferably be dielectric heating drying, and the external heating method may preferably be hot air drying. The drying temperature is preferably from 50 to 130° C., and more preferably from 80 to 130° C.

(Firing Step)

The obtained dried honeycomb body is then fired to produce a honeycomb fired body. In the firing step according to Embodiment 2, the honeycomb fired body can be fired under the same conditions as those of the firing step according to Embodiment 1. Further, as in Embodiment 1, the honeycomb fired body may be used as a honeycomb structure as it is, or the electrode portions may be provided on the side surface of the honeycomb fired body to produce a honeycomb structure having the electrode portions.

(4. Method for Producing Electrically Heating Support)

In one embodiment of the method for the electrically heating support 30 according to the present invention, a metal electrode is electrically connected to each of the pair of electrode portions on the honeycomb structure 10. Examples of the fixing method includes laser welding, thermal spraying, ultrasonic welding, and the like. More particularly, a pair of metal electrodes are provided on the surfaces of the electrode portions across the central axis of the pillar shaped honeycomb structure portion 11. The electrically heating support 30 according to an embodiment of the present invention is thus obtained. According to such a configuration, the interior of the honeycomb structure of the electrically heating support can be controlled to the desired electrical resistivity distribution, thereby producing the electrically heating support having the desired effect of reducing the energy to purify the exhaust gas or suppressing the deviation of the heat generation distribution to achieve uniform heat generation, or the like.

(5. Exhaust Gas Purifying Device)

The electrically heating support according to the above embodiment of the present invention can be used for an exhaust gas purifying device. The exhaust gas purifying device includes the electrically heating support and a metallic cylindrical member for holding the electrically heating support. In the exhaust gas purifying device, the electrically heating support can be installed in an exhaust gas flow passage for allowing an exhaust gas from an engine to flow.

EXAMPLES

Hereinafter, Examples is illustrated for better understanding of the present invention and its advantages, but the present invention is not limited to these Examples.

Examples 1-3, and Comparative Examples 1, 2

(1. Production of Green Body)

Silicon carbide (SiC) powder and metal silicon (Si) powder were mixed in a mass ratio of 80:20 to prepare a ceramic raw material. To the ceramic raw material were added hydroxypropylmethyl cellulose as a binder, a water absorbing resin as a pore former, and water to form a forming raw material. Each of the resulting forming raw materials was then kneaded by means of a vacuum kneading machine to prepare a cylindrical green body. Table 1 shows a screw rotation speed, a degree of vacuum, a temperature difference between the inside and outside, and a kneaded material density of the vacuum kneading machine. The content of the binder was 7.0 parts by mass when the total of the silicon carbide (SiC) powder and the metal silicon (Si) powder was 100 parts by mass. The content of the pore former was 3.0 parts by mass when the total of the silicon carbide (SiC) powder and the metal silicon (Si) powder was 100 parts by mass. The content of water was 42 parts by mass when the total of the silicon carbide (SiC) powder and the metal silicon (Si) powder was 100 parts by mass. The average particle diameter of the silicon carbide powder was 20 μm, and the average particle diameter of the metal silicon powder was 6 μm. The average particle diameter of the pore former was 20 μm. The average particle diameter of each of the silicon carbide powder, the metal silicon powder and the pore former refers to an arithmetic average diameter on volume basis, when measuring frequency distribution of the particle size by the laser diffraction method.

(2. Production of Honeycomb Formed Body)

Each of the obtained cylindrical green bodies was formed using an extrusion molding machine having a grid-like die structure to obtain a cylindrical honeycomb formed body in which each shape of the cells was hexagonal in the cross section perpendicular to the flow passage direction of the cells. At this time, a degree of convexity at the tip of the honeycomb formed body extruded from the extrusion molding machine and a degree of vacuum of the extrusion molding machine were controlled as shown in Table 1. In each of Examples 1 to 3, the degree of convexity at the tip of the honeycomb formed body was 0 mm, that is, the honeycomb formed body had a flat tip. In Comparative Example 1, the irregularity pattern at the tip of the honeycomb formed body extruded from the molding machine was convex (a degree of convexity: h1=5 mm) shown in FIG. 5 (*a*), and in Comparative Example 2, it was concave as shown in FIG. 5 (*b*) (a degree of convexity: h2=−5 mm). The volume fraction of the portion that can form the pores of the honeycomb formed body was determined as follows. A sample is cut out from each honeycomb formed body so as to include the central region and the outer peripheral region, and the sample was dried and fired under the same conditions as those as when the honeycomb fired body as described later was produced to form a fired body sample. The porosity of each of the central region and the outer peripheral region of the produced fired body sample was measured with a mercury porosimeter, and the resulting value was determined to be the volume fraction of the portion that can form the pores of the honeycomb formed body. As for the volume fraction of the portion that can form the pores of the honeycomb dried body, a fired body sample was prepared in the same manner, and the porosity of the fired body sample was measured, and the measured value was determined to be the volume fraction.

(3. Production of Honeycomb Dried Body)

The honeycomb formed body was then dried by high frequency dielectric heating, and then dried at 120° C. for 2 hours using a hot air dryer to produce a honeycomb dried body. Table 1 shows the conveying speed of each honeycomb formed body in the drying step, the height of each electrode used for high-frequency dielectric heating/drying, and the dielectric scattering rate by the high-frequency dielectric heating/drying. The "Electrode Height" in Table 1 indicates how high the electrode is relative to the position of the honeycomb cover member provided so as to cover the honeycomb dried body during dielectric heating. Further, the "Dielectric Scattering Rate" was obtained by determining an amount of scattered moisture from a difference between masses of the honeycomb formed body and the honeycomb dried body, and dividing this by the intrinsic moisture contained in the honeycomb formed body.

Thus, in the cross section perpendicular to the flow passage direction of the cell of the honeycomb fired body, the central region from the center to ½r of the cross section and the outer peripheral region from ½r to r were controlled in advance so as to have the porosity as shown in Table 2, in which r is the radius of the cross section. The porosity of the honeycomb dried body was measured for each of the central region and the outer peripheral region by means of a mercury porosimeter.

(4. Production of Honeycomb Fired Body)

Each honeycomb dried body was then fired in an Ar atmosphere at 1400° C. for 3 hours to obtain a honeycomb fired body (a pillar shaped honeycomb structure). The porosity of the obtained honeycomb fired body was measured for each of the central region and the outer peripheral region by means of a mercury porosimeter.

The honeycomb structure had circular end faces each having a diameter of 100 mm and a height (length in the flow passage direction of the cells) of 100 mm. The cell density is 93 cells/cm$^2$, the thickness of the partition was 10.6 μm, and the average pore diameter of the partition wall was 8.6 μm.

(5. Evaluation of Resistivity)

A silver paste and a silver wire were placed at four points in the axial direction on each sample cut out in a rod shape from each honeycomb fired body, and then measured by the 4-terminal method. The resistivities of the central region and the outer peripheral region as shown in Table 2, which are the measurement results, represent a resistivity (%) when the resistivity of the fired body having a porosity of 38.0% in the central region is 100%, and a resistivity (%) when the resistivity of the fired body having a porosity of 38.0% in the outer peripheral region is 100%, respectively.

The test conditions and evaluation results are shown in Tables 1 and 2.

TABLE 1

| | Kneading | | | Forming | | | Drying | | |
|---|---|---|---|---|---|---|---|---|---|
| | Screw Rotation Speed rpm | Degree of Vacuum Pa | Temperature Difference between Inside and Outside °C. | Kneading Material Density g/cm³ | Degree of Convexity mm | Degree of Vacuum Pa | Electrode Height mm | Conveying Speed mm/min | Dielectric Scattering Rate % |
| Example 1 | 1300 | −0.1 | 0 | 1.938 | 0 | −0.1 | +20 mm | 180 | 60 |
| Example 2 | 1300 | −0.09 | 0 | 1.923 | 0 | −0.1 | +20 mm | 180 | 60 |
| Example 3 | 1300 | −0.1 | 0 | 1.938 | 0 | −0.1 | +40 mm | 200 | 45 |
| Comparative Example 1 | 1300 | −0.1 | 0 | 1.938 | 5 | −0.1 | +20 mm | 180 | 60 |
| Comparative Example 2 | 1300 | −0.1 | 0 | 1.938 | −5 | −0.1 | +20 mm | 180 | 60 |

TABLE 2

| | Formed Body Volume Fraction | | Dried Body Porosity | | Dried Body Volume Fraction | | Fired Body Porosity | | Predetermined Porosity | | Resistivity | |
|---|---|---|---|---|---|---|---|---|---|---|---|---|
| | Central Region % | Outer Peripheral Region % | Central Region % | Outer Peripheral Region % | Central Region % | Outer Peripheral Region % | Central Region % | Outer Peripheral Region % | Central Region % | Outer Peripheral Region % | Central Region % | Outer Peripheral Region % |
| Example 1 | 38.0 | 38.5 | 32.0 | 32.5 | 38.0 | 38.5 | 38.0 | 38.5 | 38.0 | 38.0 | 100.0 | 120.0 |
| Example 2 | 39.0 | 39.0 | 33.0 | 33.0 | 39.0 | 39.0 | 39.0 | 39.0 | 39.0 | 39.0 | 140.0 | 140.0 |
| Example 3 | 39.0 | 39.0 | 33.0 | 33.0 | 39.0 | 39.0 | 39.0 | 39.0 | 39.0 | 39.0 | 140.0 | 140.0 |
| Comp. 1 | 37.0 | 39.0 | 31.0 | 33.0 | 37.0 | 39.0 | 37.0 | 39.0 | 38.0 | 38.0 | 60.0 | 140.0 |
| Comp. 2 | 39.0 | 37.0 | 33.0 | 31.0 | 39.0 | 37.0 | 39.0 | 37.0 | 38.0 | 38.0 | 140.0 | 60.0 |

(6. Discussion)

In each of Examples 1 to 3, the honeycomb dried body was produced so that the absolute value of the difference in the volume fraction of the portion that can form the pores in each of the central region and the outer peripheral region of the honeycomb dried body relative to the previously set, predetermined porosity (porosity of the honeycomb fired body) was within 0.5%. As a result, the variation in resistivities (difference between the resistivities in the central region and the outer peripheral region in Table 2) was 20% or less between the central region and the outer peripheral region of the honeycomb structure, and the honeycomb structure having a decreased variation in resistivities was obtained.

In each of Comparative Examples 1 and 2, the absolute value of the difference in the volume fraction of the portion that can form the pores in the central region and the outer peripheral region of the honeycomb dried body relative to the previously set, predetermined porosity (porosity of the honeycomb fired body) was beyond the 0.5% range. As a result, the variation in resistivities was 80% between the central region and the outer peripheral region of the honeycomb structure, and any desired electrical resistivity distribution could not be obtained.

In Table 2, for each of Examples 1 to 3 and Comparative Examples 1 and 2, the "Dry Body Porosity" is significantly lower than the "Fired Body Porosity". This is because the pore former is contained in addition to the pores, and the pore former forms the pores in the fired body.

DESCRIPTION OF REFERENCE NUMERALS 10 honeycomb structure
11 pillar shaped honeycomb structure portion
12 outer peripheral wall
13a, 13b electrode portion
18 cell
19 partition wall
30 electrically heating support
33a, 33b metal electrode
40 molding machine
41 die
42 green body
43 honeycomb formed body

The invention claimed is:

1. A method for producing a conductive honeycomb structure, the method comprising:
 a forming step of extruding a forming raw material containing a conductive ceramic raw material to obtain a honeycomb formed body, the honeycomb formed body comprising: an outer peripheral wall; and a partition wall disposed on an inner side of the outer peripheral wall, the partition wall defining a plurality of cells to form a flow passage extending from one end face to an other end face;
 a drying step of drying the honeycomb formed body to obtain a honeycomb dried body; and
 a firing step of firing the honeycomb dried body to obtain a honeycomb fired body,
 wherein the forming step comprises a step of controlling a volume fraction of a portion that can form pores of the honeycomb formed body so that an absolute value of a difference in the volume fraction of the portion that can form the pores in predetermined regions of the honeycomb formed body relative to a previously set, predetermined porosity of the honeycomb fired body is within 0.5%; and wherein the predetermined porosity is a porosity preset for each of the predetermined regions in a cross section perpendicular to a flow passage direction of the cells of the honeycomb fired body.

2. The method for producing the conductive honeycomb structure according to claim 1,
wherein, in the cross section perpendicular to the flow passage direction of the cells of the honeycomb fired body, the predetermined regions have a central region from a center to ½r of the cross section, and an outer peripheral region from ½r to r, in which r is a radius of the cross section, and
the step of controlling the volume fraction of the portion that can form the pores of the honeycomb formed body comprises controlling the absolute value of the difference in the volume fraction of the portion that can form the pores in each of the central region and the outer peripheral region of the honeycomb formed body relative to the previously set, predetermined porosity of each of the central region and the outer peripheral region of the honeycomb fired body to be within 0.5%.

3. The method for producing the conductive honeycomb structure according to claim 1, wherein the volume fraction of the portion that can form the pores of the honeycomb formed body represents a total volume fraction of pores, a pore former and moisture contained in the honeycomb formed body.

4. The method for producing the honeycomb structure according to claim 1, wherein the step of controlling the volume fraction of the portion that can form the pores of the honeycomb formed body comprises a step of controlling a density distribution in the forming raw material to be from 1.5 to 2.2 g/cm$^3$ by using a kneading machine.

5. The method for producing the honeycomb structure according to claim 1, wherein the step of controlling the volume fraction of the portion that can form the pores of the honeycomb formed body comprises a step of controlling the forming the raw material by controlling a rotation speed of a screw used in a kneading machine, a degree of vacuum in the kneading machine, and/or a temperature distribution in the kneading machine.

6. The method for producing the conductive honeycomb structure according to claim 1, wherein the step of controlling the volume fraction of the portion that can form the pores of the honeycomb formed body comprises a step of controlling the forming raw material by controlling an irregularity pattern at a tip of the honeycomb formed body extruded from a molding machine having a die, a temperature distribution in the molding machine, a length of a drawing jig in a passage direction of the forming raw material, the drawing jig being provided on an upstream side of the die in the passage of the forming raw material, and/or a length of the honeycomb formed body.

7. A method for producing a conductive honeycomb structure, the method comprising:
a forming step of extruding a forming raw material containing a conductive ceramic raw material to obtain a honeycomb formed body, the honeycomb formed body comprising: an outer peripheral wall; and a partition wall disposed on an inner side of the outer peripheral wall, the partition wall defining a plurality of cells to form a flow passage extending from one end face to an other end face;
a drying step of drying the honeycomb formed body to obtain a honeycomb dried body; and
a firing step of firing the honeycomb dried body to obtain a honeycomb fired body,
wherein the drying step comprises a step of controlling a volume fraction of a portion that can form pores of the honeycomb dried body so that an absolute value of a difference in the volume fraction of the portion that can form the pores in predetermined regions of the honeycomb dried body relative to a previously set, predetermined porosity of the honeycomb fired body is within 0.5%; and
wherein the predetermined porosity is a porosity preset for each of the predetermined regions in a cross section perpendicular to a flow passage direction of the cells of the honeycomb fired body.

8. The method for producing the conductive honeycomb structure according to claim 7,
wherein, in the cross section perpendicular to the flow passage direction of the cells of the honeycomb fired body, the predetermined regions have a central region from a center to ½r of the cross section, and an outer peripheral region from ½r to r, in which r is a radius of the cross section, and
the step of controlling the volume fraction of the portion that can form the pores of the honeycomb dried body comprises a step of controlling the absolute value of the difference in the volume fraction of the portion that can form the pores in each of the central region and the outer peripheral region of the honeycomb dried body relative to the previously set, predetermined porosity of each of the central region and the outer peripheral region of the honeycomb fired body to be within 0.5%.

9. The method for producing the conductive honeycomb structure according to claim 7, wherein the volume fraction of the portion that can form the pores of the honeycomb dried body represents a total volume fraction of pores, a pore former and moisture contained in the honeycomb dried body.

10. The method for producing the conductive honeycomb structure according to claim 7, wherein the step of controlling the volume fraction of the portion that can form the pores of the honeycomb dried body comprises a step of controlling a moisture scattering rate of the honeycomb formed body, a distance between electrodes of parallel plate electrodes used when the drying is carried out by dielectric heating, and/or a drying time of the honeycomb formed body.

11. The method for producing the conductive honeycomb structure according to claim 1, wherein, in the cross section perpendicular to the flow passage direction of the cells of the conductive honeycomb structure, an absolute value of a difference in a porosity of the outer peripheral region from ½r to r of the cross section relative to a porosity of the central region from the center to ½r of the cross section is within 0.5%, in which r is a radius of the cross section.

12. The method for producing the conductive honeycomb structure according to claim 1, wherein, in the cross section perpendicular to the flow passage direction of the cells of the conductive honeycomb structure, the difference in the porosity of the outer peripheral region from ½r to r of the cross section relative to the porosity of the central region from the center to ½r of the cross section is −0.5% or less, +0.5% or more, in which r is a radius of the cross section.

13. The method for producing the conductive honeycomb structure according to claim 1, wherein the method further comprises the steps of:
producing a honeycomb fired body with unfired electrode portions by applying an electrode portion forming raw material containing a ceramic raw material to a side surface of the honeycomb fired body, and drying it to form a pair of unfired electrode portions on an outer surface of the outer peripheral wall across a central axis of the honeycomb fired body so as to extend in a form of strip in the flow passage direction of the cells, and firing the honeycomb fired body with unfired electrode portions to produce a conductive honeycomb structure having a pair of electrode portions.

14. A method for producing an electrically heating support, wherein the method comprises a step of electrically connecting a metal electrode to each of the pair of electrode portions of the conductive honeycomb structure produced by the method according to claim 13.

* * * * *